(12) United States Patent
Ogawa et al.

(10) Patent No.: US 7,065,280 B2
(45) Date of Patent: Jun. 20, 2006

(54) DISPERSION COMPENSATION DEVICE

(75) Inventors: Kensuke Ogawa, Tokyo (JP);
Yong-Tsong Tan, Singapore (SG)

(73) Assignee: Bussan Nanotech Research, Inc., Tokyo (JP)

( * ) Notice: Subject to any disclaimer, the term of this patent is extended or adjusted under 35 U.S.C. 154(b) by 0 days.

(21) Appl. No.: 11/259,146

(22) Filed: Oct. 27, 2005

(65) Prior Publication Data

US 2006/0093299 A1 May 4, 2006

(30) Foreign Application Priority Data

Oct. 29, 2004 (JP) .............................. 2004-315167

(51) Int. Cl.
*G02B 6/02* (2006.01)
*G02B 6/44* (2006.01)
*G02B 6/10* (2006.01)
*H04J 14/02* (2006.01)

(52) U.S. Cl. ...................... 385/126; 385/114; 385/122; 385/129; 385/130; 385/131; 398/81

(58) Field of Classification Search ................. 385/114, 385/122, 126, 129–131; 398/81
See application file for complete search history.

(56) References Cited

U.S. PATENT DOCUMENTS 6,928,221 B1 * 8/2005 Gorni et al. ................. 385/125

6,937,781 B1 * 8/2005 Shirane et al. ................ 385/16
2001/0006567 A1 * 7/2001 Yokoyama et al. .......... 385/14
2004/0213536 A1 10/2004 Zoorob et al. .............. 385/131

FOREIGN PATENT DOCUMENTS

JP 2002-333536 A 11/2002 .................. 385/14
JP 2000-121987 A 4/2004 .................. 359/577

* cited by examiner

*Primary Examiner*—Brian Healy
*Assistant Examiner*—Jerry Martin Blevins
(74) *Attorney, Agent, or Firm*—Sughrue Mion, PLLC

(57) ABSTRACT

A dispersion compensation device for compensating chromatic dispersion of optical pulses launched from the exterior is disclosed. The device comprises a waveguide and a photonic crystal part, the waveguide comprising a core part for guiding the optical pulse from an input end to an output end and a clad part consisting of a first clad layer and a second clad layer, the photonic crystal part providing a chromatic dispersion variation of a proper dispersion characteristic to the optical pulses guided through the waveguide, the chromatic dispersion variation having an absolute value of the variation and a positive or negative sign, wherein the photonic crystal part is layered onto the first clad layer, the core part is layered onto the photonic crystal part, and the second clad part is formed so that a portion of which is layered onto the photonic crystal part and a remaining part of which covers the exposed surface of the core part.

9 Claims, 12 Drawing Sheets

DISPERSION COMPENSATION DEVICE

TECHNICAL FIELD

This invention relates to a dispersion compensation device, particularly, this invention relates to a low-loss dispersion compensation device which is provided with a photonic crystal region and a core region for leading light, wherein the photonic crystal region and the core region are separately formed.

RELATED ARTS

In recent years, long-haul data communication has been performed through optical fibers, and the transmission rate of data has risen drastically from the past. With respect to the data communication through such optical fibers, communication using ultrashort optical pulses at a rate of 160 Gbit/s or more, which rate is extremely higher than the rate presently used, is now under investigation.

When performing the data communication, usually, the problems about crosstalk and transmission error would come up. The higher transmission velocity of the data, the narrower temporal width of individual optical pulse and time interval between adjacent pulses are naturally provided. Therefore, the above mentioned problems will grow into particularly important things.

The speed that light passes through a material is limited by the refractive index of the material. The larger refractive index, the lesser light speed is provided. In the material such as glass, semiconductor, or optical crystal, the refractive index is varied by the frequency of light (wavelength in air), and therefore, the speed of light depends on the wavelength of the light. It is known that during the propagation of optical pulses through a material the waveforms of the optical pulses are distorted by such a dependence of refractive index on wavelength, and which phenomenon will become a factor of the broadening of the optical pulses in the time domain. Hereinafter, such a characteristic that the light speed is varied by the wavelength of the light is referred to as "chromatic dispersion" or simply, "dispersion".

As mentioned above, during the propagation through optical fibers, the optical pulses are distorted, and broadened in its time width. At the conventional transmission rate, since time width of the optical pulse is also amply large originally, such distortion and broadening are not developed to serious problems. When the data transmission rate is increased, however, the crosstalk and transmission error are caused since the adjacent pulses come to interfere with each other in front and behind, or by some other adverse events. Thus, only by an increase in the transmission rate under the conventional technology, it is impossible to realize an optical communication at a higher data rate.

Considering such problems, studies of compensating the chromatic dispersion with using a photonic crystal, etc. have already attempted.

The photonic crystal has a structure where two materials of which refractive indexes are mutually different are arranged periodically. When a defect waveguide, i.e., continuous defects part is formed in the photonic crystal by introducing defects in a part of the array, only a light having a specific frequency can pass through the waveguide, and a waveguide mode which gives a specific wavelength distribution to the light is created. Using this waveguide mode, the chromatic dispersion in the optical fiber transmission line is compensated. See, for example, Kazuhiko Hosomi and Toshio Katsuyama, "Light transmission characteristics of a coupled-defect waveguide in photonic crystals (2)", Digest on the 63$^{rd}$ autumn meeting of Japan Applied Physics, The Japan Society of Applied Physics, Sep. 24, 2002, vol. 3, p. 917; Kazuhiko Hosomi and Toshio Katsuyama, IEEE J. Quantum Electron., July 2002, vol. 38, issue 7, pp. 825–829; Kazuhiko Hosomi and Toshio Katsuyama, "Characteristics of a coupled-defect waveguide in photonic crystals", PECS-IV Abstract Book, Oct. 28–31, 2002, UCLA, Los Angeles, p. 52.

WO2004/063797 discloses a dispersion compensation device which can provide a proper respective chromatic dispersion changes with respect to each order of chromatic dispersion terms in optical phase against wavelength (or frequency, hereinafter, they are simply referred to as "wavelength".) to the transmitted light by providing in photonic crystals defect waveguides along which the light is transmitted.

SUMMARY OF THE INVENTION

In accordance with the construction of the dispersion compensation device of the prior art, since the waveguides (defect waveguides) through which the optical pulses are transmitted are provided in the photonic crystals, the sizes of the waveguides should depend on the thickness or size of the photonic crystals layer, thus, as a result, the obtained waveguides have small cross-sectional areas.

When optical pulses are launched into such a waveguide having a small cross-sectional area, loss through the waveguide will be very large. It is hardly possible to apply the dispersion compensation device of such a high loss to the ultrafast and large capacity optical communication utilizing a broad spectral band.

Therefore, this invention aims to provide a new dispersion compensation device of a low loss and capable of realizing a higher transmission rate for the optical communication utilizing ultrashort optical pulses.

To solve the above mentioned problems, the dispersion compensation device for compensating chromatic dispersion of optical pulses launched from the exterior according to the present invention is characterized by comprising a waveguide and a photonic crystal part, the waveguide comprising a core part for guiding the optical pulses from an input end to an output end and a clad part consisting of a first clad layer and a second clad layer, the photonic crystal part providing a chromatic dispersion variation of a proper dispersion characteristic to the optical pulses guided through the waveguide, the chromatic dispersion variation having an absolute value of the variation and a positive or negative sign, wherein the photonic crystal part is layered onto the first clad layer, the core part is layered onto the photonic crystal part, and the second clad part is formed so that a portion of which is layered onto the photonic crystal part and a remaining part of which covers the exposed surface of the core part.

In accordance with this construction, since the photonic crystal part for providing chromatic dispersion and the waveguide for guiding the light is prepared separately, both the photonic crystal part and the waveguide can be designed mutually independently. What this possibility means is a free design of the cross-section area of the waveguide, for instance, a material modification between the core part and clad part in order to provide a refractive difference therebetween. Thus, when the dispersion compensation device and the optical fiber are jointed in order to launch the optical pulse into the dispersion compensation device from the optical fiber, it is possible to take the optical pulse of adequate quality into the device with keeping the loss to a minimum in order to make dispersion compensation reliably. Further, since the core part is layered onto the photonic crystal part, the light guided through the core part can receive reliably the chromatic dispersion variation from the photonic crystal part.

In a preferred embodiment of the present invention, the photonic crystal part is made of a first material and a second material, the refractive index of the first and second materials being different from each other, and plane-shaped laminae made of the first material and each having a predetermined size being arrayed at predetermined intervals in the matrix made of the second material.

In this embodiment, since the first material which has a different refractive index from that of the second material can be arrayed as plane laminae of a predetermined size at predetermined intervals into the second material, it is possible to provide the dispersion compensation device according to the present invention with a relatively low cost and without a lapse into complexity of constitution.

In a further embodiment, the photonic crystal part comprises two or more regions which are laid along the propagation direction of the optical pulses guided through the waveguide, and the size and interval of the first material in each region are determined so that the respective regions have a mutually different dispersion characteristic.

According to this embodiment, by varying the size and interval of the first material which is arranged in the second material from region to region, it is possible to realize positive or negative signs' dispersion compensation, and multiple-order dispersion compensation.

In another embodiment of the present invention, the dispersion compensation device further comprises an energy supplying part from which an energy is supplied to the photonic crystal part so that the absolute value and the sign of the chromatic dispersion is controlled by changing the refractive index of the waveguide.

According to this embodiment, since an energy supplying part is provided which can give an energy such as electric, thermal or pressure energy, externally and independently, the energy being capable of changing the refractive index of the waveguide, it is possible to control freely the chromatic dispersion variation to the optical pulses.

In a further embodiment of the present invention, the energy supplying part gives the energy to the individual regions of the photonic crystal part.

According to this embodiment, since the energy supplying can be made to the regions separately, it is possible to control the positive and negative signs' dispersion compensation, or the multiple-order dispersion compensation which are aimed by individual regions independently.

In a still further embodiment, the second material is a semiconductor which possesses a predetermined carrier density under the stationary state, and the energy supplying part imparts an energy to the photonic crystal part, so that the energy induces a change in the carrier density in the semiconductor.

According to this embodiment, by varying the carrier density of the semiconductor as the second material in the photonic crystal part, it is possible to provide the chromatic dispersion variation to the optical pulse guided through the waveguide.

In a preferable embodiment of the present invention, the energy supplying part comprises a voltage applying part which applies voltage onto the photonic crystal part in order to vary the carrier density in the semiconductor.

According to this embodiment of the present invention, by applying voltage to the photonic crystal part so as to vary the carrier density in the semiconductor as the second material in the photonic crystal part, it is possible to provide the chromatic dispersion variation to the optical pulses guided through the waveguide.

In a further preferable embodiment, the energy supplying part comprises a potential holding part for holding the potential of the second material to a prescribed level.

According to this embodiment, it is possible to hold the potential of the second material in the photonic crystal part to a prescribed level, thus, it is expected that the more stable dispersion compensation can be performed to the optical pulse In an embodiment of the present invention, the dispersion compensation device further comprises barrier regions which inhibit the propagation of the light and which are formed along the light propagation direction in the both sides of the photonic crystal part.

According to this embodiment, by preventing the diffusion of the light at the direction perpendicular to the light progressive direction, it is possible to make transmit light surely precisely.

As described above, according to the present invention, since the photonic crystal part for providing a chromatic dispersion and the waveguide for conducting the light is prepared separately, it is possible to provide a low loss dispersion compensation device where a free design of the cross-section area of the waveguide can be practiced, the optical pulses can take into the device with keeping the loss to a minimum, and thus the dispersion compensation can make reliably.

The numerals shown in the above drawings represent the following articles or parts, respectively:

| | |
|---|---|
| 1 | dispersion compensation device |
| 2 | substrate |
| 3 | clad layer |
| 4 | photonic crystal layer |
| 41 | hole |
| 42 | terminal part |
| 5, 5A, 5B, | core layer |
| 6 | clad layer |
| 7 | internal electrode |
| 7a | electrode |
| 8a, 8b | electrodes |
| 9 | reference electrode |
| R1 | photonic crystal region |
| R2 | extended region |
| a, d | intervals |
| r | radius |

BEST MODE FOR CARRYING OUT THE INVENTION

Now, the present invention will be described in detail with reference to some embodiments which are non-restrictive ones, and disclosed only for the purpose of facilitating the illustration and understanding of the present invention.

<Constitution and Function of Dispersion Compensation Device>

At first, the constitution and function of the dispersion compensation device according to an embodiment of the present invention will be explained with referring to FIGS. 1 to 3.

Figure 1:
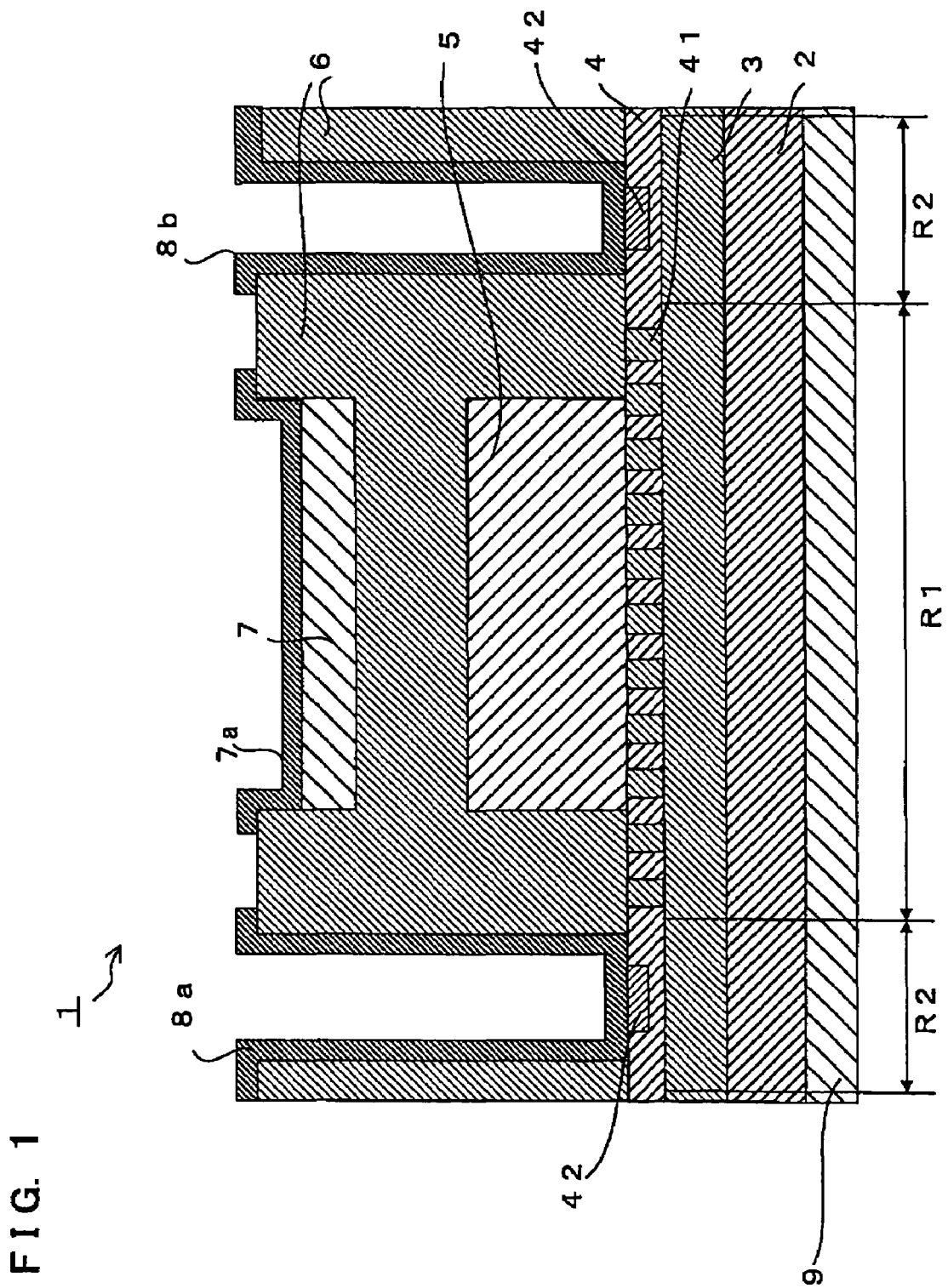
FIG. 1 is a cross section of a dispersion compensation device according to one embodiment of the present invention.

FIG. 1 is a cross section of a dispersion compensation device according to one embodiment of the present invention.

As shown in FIG. 1, dispersion compensation device 1 of this embodiment is composed of a substrate 2, a photonic crystal layer (photonic crystal part) 4, core layer for conducting optical pulse (core part) 5, a clad layer (first clad layer) 3 and a clad layer (second clad layer) 6 which function as waveguide in combination with the core layer 5, and an internal electrode 7, an electrode 7a, electrodes 8a and 8b, and a reference electrode 9, which electrodes function as energy supplying parts for supplying predetermined energy to the respective constructive members.

Incidentally, hereinafter, the "bottom" and the "top", or the "above" and the "below" relations regarding the parts or portion of the dispersion compensation device is discussed on the basis of the layering sequence on the substrate 3, when the substrate 3 is set at bottom side, as shown in FIG. 1. Thus, it should be understood that any reverse relations which are obtained by turning the relations disclosed herein upside down are naturally involved in the scope and range of the present invention.

For example, as for the substrate 2, it may be made of silicon (Si) and impurities are doped in order to provide electrical conductivity.

The clad layer 3 functions as the waveguide in combination with the core layer 5 and the clad layer 6, and is made of silicon oxide ($SiO_2$) film or silicon nitride film, for example, and is layered on the substrate 2.

The photonic crystal layer 4 is the member for providing a chromatic dispersion variation of a dispersion characteristic to the light guided through the dispersion compensation device 1, the dispersion characteristic including an absolute value of the variation and a positive or negative sign. For example, this photonic crystal layer 4 is fabricated by using Si as a second material which is the matrix of the layer, and is layered on the clad layer 3.

More specifically, the photonic crystal layer 4 is composed of photonic crystal region R1 and extended regions R2, the photonic crystal region R1 being prepared by providing a plural number of plane-shaped holes 41 to the host material which is made of Si, for example, and then filling up the holes 41 with a first material such as $SiO_2$ of which dielectric constant is different from that of the matrix material, and the extended regions being located at both sides of the photonic crystal region R1 and being not provided with the hole 41.

The "plane-shaped" used herein means the shape which is arranged to the direction of the two dimensions in the photonic crystal layer 4, such as flat plane-shape. When the photonic crystal layer 4 is formed with a shape which is composed of a combination of some curved faces, or a combination of curved faces and flat faces during the manufacturing process, the arrangement along such a shape of the photonic crystal layer is involved in the "plane-shape", as far as it can function as the photonic crystal in the present invention of providing the chromatic dispersion variation. It is preferable, however, that the photonic crystal layer is formed as the flat plane-shape as one embodiment of plane-shape, considering the linearity of the light launched to the dispersion compensation device 1.

The matrix material (Si) part in the photonic crystal region R1 of the photonic crystal layer 4 functions as the second material according to this invention, and the hole 41 ($SiO_2$) part functions as the first material according to the present invention. Incidentally, with respect to the detailed explanation of the photonic crystal layer 4 and the chromatic dispersion variation which is promoted by the photonic crystal layer 4, it will be explained later.

The core layer 5 functions as the waveguide in combination with the clad layer 3 and clad layer 6. It is used for guiding the optical pulses from an input end to an output end of the dispersion compensation device 1. For example, it is made of silicon nitride ($Si_3N_4$), and it is layered on the photonic crystal region R1 of the photonic crystal layer 4.

The clad layer 6 functions as the waveguide in combination with the clad layer 3 and core layer 5. For example, it is made of $SiO_2$ film or the silicon nitride film as in case of the clad layer 3. And it is layered on the core layer 5 and photonic crystal layer 4 so that it covers the exposed surface of core part 5. Namely, in FIG. 1 where the respective layers are drawn upwardly from the substrate 2 at the bottom side in accordance with the lamination order, the upper surface and side surface of core part 5 are the exposed surface, and thus covered with the clad layer 6.

For example, the internal electrode 7 is made of aluminum (Al) and so on, and is layered on the clad layer 6 so as to be arranged on the upper side of the core layer 5. The internal electrode 7 functions as an energy supplying part and a voltage applying part, and is for applying a predetermined bias voltage to the photonic crystal layer 4. Incidentally, when the photonic crystal layer includes four regions (I)–(IV) as mentioned in details later, the internal electrodes 7 are provided for every four regions (I)–(IV) independently, in order to apply the bias voltage to every regions separately. By this impression, the carrier density of the photonic crystal layer is varied, and then the refractive index thereof is changed so that it comes to provide the dispersion compensation variation to the optical pulses. Thus, it is possible to control the positive and negative signs' dispersion compensation, or the multiple-order dispersion compensation which are aimed by individual regions independently. The internal electrode 7 can be prepared in any fashion as long as it can be controlled by the individual regions independently. Therefore, it is possible to prepare one electrode per a region, or to prepare an electrode unit which comprises two or more electrodes mutually independent.

The electrode 7a, and electrodes 8a, 8b are made of titanium/the nickel alloy (TiNi) and aluminum/copper alloy (AlCu), for example. The interface thereof with the clad layer 6 and the photonic crystal layer 4 is formed by the titanium/the nickel alloy (TiNi) which is relatively hard alloy, and the interface thereof with a lead wire (not shown) is formed by aluminum/copper alloy (AlCu) which is relatively soft alloy.

With this constitution, it is possible to adhere it to the clad layer 6 or the photonic crystal layer 4 via the titanium/the nickel alloy (TiNi) firmly, and to adhere it to the lead wire or the like via the aluminum/copper alloy (AlCu) firmly. Therefore, these electrodes can be electrically connected with an external electrode (not shown) via the lead line, and thus, the voltage controls to the electrode 7a, and the electrodes 8a and 8b can be practiced via the external electrode.

Also, the electrodes 8a and 8b function as the energy supplying part and are provided on the extension areas R2 mentioned later. With this constitution, they are electrically contact with the Si part (the part other than the hole 41 of the photonic crystal layer 4) as the matrix material of the photonic crystal layer 4 via terminal part, and thus, it functions as a potential holding part for holding the potential of the second material.

Further, when the electrode 8a is considered as drain in FET (Field Effect Transistor), and the electrode 8b is considered as source and is GND connected, it is possible to apply a bias on the Si part which is the matrix material in the photonic crystal layer 4. This bias is applied to be positive when the concerned Si part is n type, and in case of the p type, it to be a negative bias.

According to this, the dispersion characteristic can be grasped by measuring the electric current which flows between the electrodes 8a and 8b, and monitoring the carrier density change of the Si part in the photonic crystal layer 4 outsidely. Further, by applying a bias between the electrodes 8a and 8b, the voltage applied to the Si part in the photonic crystal layer 4 can be changed by small units, and thus, the tuning for the carrier density inf the concerned Si part can be made with a high resolution.

In addition, when carriers are trapped at the interface states between the Si part of the photonic crystal layer 4 and the hole 41 formed by the $SiO_2$ film, there is a case that the carrier density in the Si part of the photonic crystal layer 4 does not change sufficiently even if the voltage is applied to the electrode 7a. In such a case, by applying voltage between the electrodes 8a and 8b, the carriers trapped at the interface states can be released, and thus, the influence of the interface states can be eliminated, and the change of carrier density in the Si part in the photonic crystal layer 4 can be smoothly promoted.

The reference electrode 9 can be made of aluminum (Al), for example. It is provided for the purpose of giving a predetermined reference voltage to the photonic crystal layer.

Incidentally, as for the fabrication procedures of dispersion compensation device 1, it is in detail explained later.

<Photonic Crystal Layer>

As mentioned above, the photonic crystal layer 4 is composed of the photonic crystal region R1 and extended regions R2, the photonic crystal region R1 being prepared by providing a plural number of holes 41 in the direction of two dimensional face to the host material which is made of Si, and then filling up the holes 41 with $SiO_2$ film as the first material of which dielectric constant is different from that of the matrix material, and the extended regions being located at both sides of the photonic crystal region R1 and being not provided with the hole 41.

Now, the photonic crystal region R1 of the photonic crystal layer 4 will be described with reference to FIG. 2A.

Figure 2A:
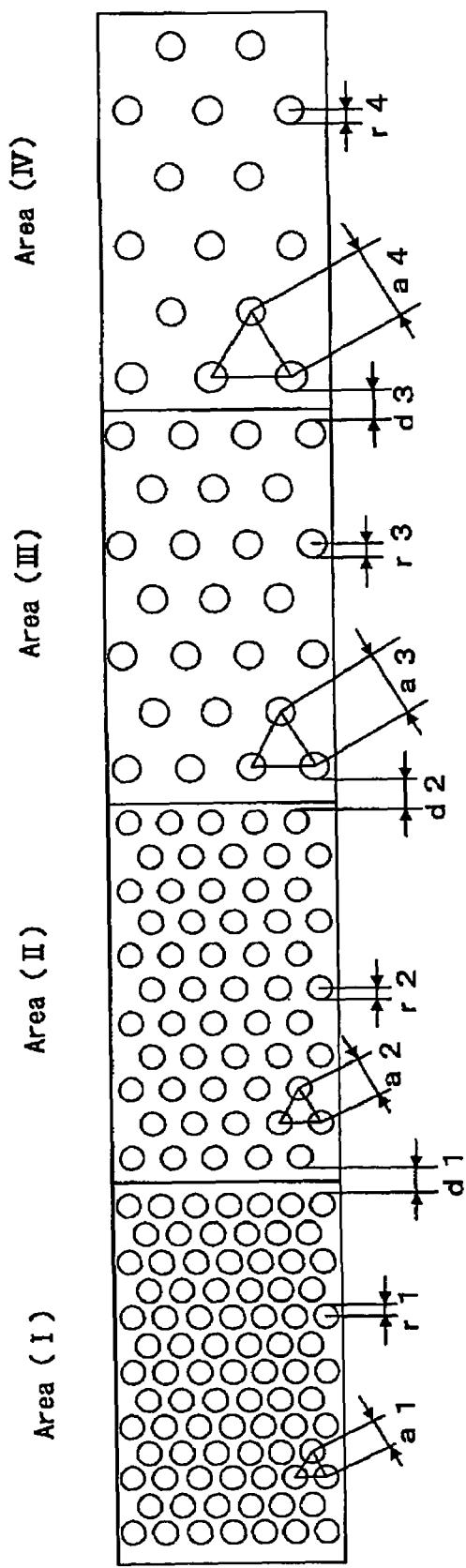
FIG. 2A is an illustrative view of a photonic crystal region R1 in a photonic crystal layer 4.

FIG. 2A is an illustrative view of the photonic crystal region R1 in the photonic crystal layer 4.

The holes 41 formed in the photonic crystal region R1 of the photonic crystal layer have a predetermined radius (size) r, and they are arranged in the triangular lattice the unit cell of which is an equilateral triangle, and among holes 41 at each unit cell, predetermined intervals (one piece of length of the equilateral triangle) a are given on the arrangement. Then, the photonic crystal region R1 is composed of the areas (I), (II), (III) and (IV), of which the radius r of the hole 41 and the interval a are mutually different. By this constitution, it is possible to realize the dispersion compensation of multiple orders for the optical pulses in the waveguide mode which is guided through the dispersion compensation device 1. Incidentally, as for the chromatic dispersion variation which is given to the optical pulses in each area, it is in detail explained later.

As shown in FIG. 2A, the respective areas are arranged so that the light attenuation by the reflection which is caused by the refractive-index difference at the boundary section between the neighboring areas is set to be minimum. Namely, if the refractive-index difference between the neighboring areas is large, it becomes easy for the propagation light to be reflected at the boundary section between the neighboring areas, and then, the light loss become large with this reflection, and this reflection also interferes to the other propagation waves, thus it has an influence on the dispersion compensation value. Therefore, it is desirable to arrange the areas so that the refractive-index difference of the neighboring areas to become as small as possible.

As shown in FIG. 2, in this embodiment, when the areas are arranged in turn along the propagation direction of light, they are arranged in the order of increasing interval a, the interval a being the distance between adjacent holes 41 in an area. Further, the interval between adjacent hole 41 of one area and hole 41 of another area at the boundary section of the neighboring areas is set to be smaller than the larger one of the intervals a between holes within the respective areas.

Concretely, assuming that the interval a between the holes 41 in the area (I) is "$a_1$", the interval a between the holes 41 in the area (II) is "$a_2$", which is larger than "$a_1$", the interval a between holes 41 in area (III) is "$a_3$", which is larger than "$a_2$", and the interval a between the holes 41 in the area (IV) is "$a_4$", which is larger than "$a_3$", the areas are arranged in the order of increasing interval a, namely, in the order of area (I), area (II), area (III), and area (IV). Additionally, the interval "$d_1$" between the adjacent hole 41 in the area (I) and hole 41 in the area (II) at the boundary section of the area (I) and the area (II) is set to be shorter than "$a_2$", the interval "$d_2$" between the adjacent hole 41 in the area (II) and hole 41 in the area (III) at the boundary section of the area (II) and the area (III) is set to be shorter than "$a_3$", and the interval "$d_3$" between the adjacent hole 41 in the area (III) and hole 41 in the area (IV) at the boundary section of the area (III) and the area (IV) is set to be shorter than "$a_4$" (See, FIG. 2A).

Figure 2B:
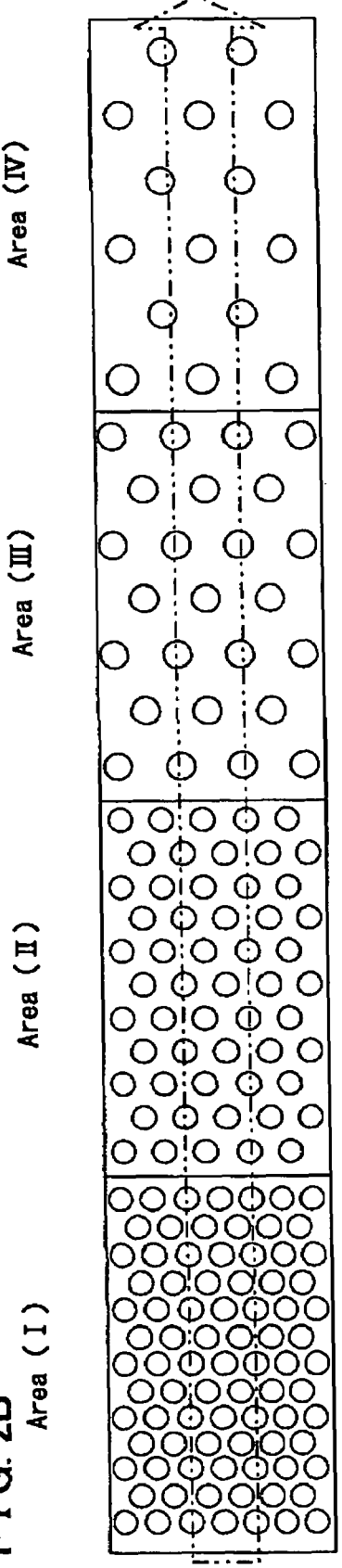
FIG. 2B is an illustrative view of light which is guided through the photonic crystal region R1 in the photonic crystal layer 4.

Thus, the light launched from the input end of the dispersion compensation device into the core layer 5 which is provided at upper side of the photonic crystal layer 4, receives individual chromatic dispersion variations in accordance with the radius r and interval a of the respective areas at the areas (I), (II), (III), and (IV), while propagating from the left to the right in FIG. 2B as shown in FIG. 2B by the arrow. Finally, the light is emitted from the output end which is provided on another side of the dispersion compensation device.

That is, the light guided in the interior of core layer 5 which is provided on the upper side of the photonic crystal region R1 in the photonic crystal layer 4 is transmitted in the core layer 5, while being reflected both with the clad layer 3 which is provided at the substrate side (bottom side in FIG. 1) of the core layer 5 and the clad layer 6 which is provided so as to cover the exposure surface, i.e., the upper surface and side surface of the core layer 5. Incidentally, because the interface of the core layer 5 and the clad layer 3 and the interface of the core layer 5 and the clad layer 6 do not become complete reflection surfaces, the light conducting in the interior of core layer 5 is not fully confined within the core layer 5 in actual fact. Therefore, the clad layer 3, core layer 5 and clad layer 6 are formed as the waveguide in the present invention.

During the light guiding in the core layer, when the light is transmitted over the area (I) of the photonic crystal layer 4, the light will receive a chromatic dispersion variation in accordance with the radius r1 of hole 41 and interval a1 in the area (I). Next, when the light is transmitted over the area (II) of the photonic crystal layer 4, the light will receive a chromatic dispersion variation in accordance with the radius r2 of hole 41 and interval a2 in the area (II). Similarly, when the light is transmitted over the areas (III) and (IV), the light will receive a chromatic dispersion variation in accordance with the radius r3 and interval a2 in the area (III), and that in accordance with the radius r4 and interval a4 in the area (IV), respectively.

Namely, the light which is output from this core layer has received the chromatic dispersion variations in all areas (I)–(IV) in the photonic crystal layer 4.

<Chromatic Dispersion Variation>

Next, the chromatic dispersion variation which is due to the photonic crystal layer 4 is described concretely.

As the photonic crystal to be used in the dispersion compensation device according to the present invention, there is two types of crystal, namely, a photonic crystal where the frequency of the light to be transmitted is correspond to the photonic band region which is laid on the so-called "lower-branch photonic band region", namely, the photonic band region which is under the photonic gap of the lowest frequency, and a photonic crystal where the frequency of the light to be propagated is correspond to the upper-branch photonic band region, namely, the photonic band region which is over the lowest photonic gap, and both types are applicable. In the following embodiment, however, the explanation will be made in the case of using a photonic crystal in which branches of the waveguide mode come closest to.

By the way, when examining the state that the light is propagated through a material, the relation of frequency and wavenumber becomes important. The speed when the light is propagated through the material is determined from this relation. This speed means the speed that the entire optical pulse moves to and is called "group velocity". The group velocity is given as the slope (the differential coefficient) of the frequency-wavenumber characteristic curve. In the vacuum or the air, the frequency-wavenumber characteristic becomes a straight line and the group velocity is constant regardless of the frequency. In some materials such as glass, semiconductor, metal, and etc., the frequency-wavenumber characteristic does not provide a straight line and the group velocity is varied by the frequency. Therefore, when the light which is launched from the air into the material, according to the frequency (permitted to paraphrase as "wavelength") of the light which is launched from the air, the group velocity should be varied. Because the optical pulses contain a wide range of wavelength components not a single-wavelength component, the optical pulses spread in the time domain with being propagated through the material when the group velocity depends on the wavelength, and the waveform is subjected to distortion. When the group velocity depends on the wavelength (or the frequency), the dependence is called "chromatic dispersion". Also, the slope at which the group velocity changes in accordance with the wavelength (or the frequency) is called "group velocity dispersion". The group velocity dispersion is equal to the second-order differentiation of the frequency-wavenumber characteristic curve. Moreover, the waveform distortion which occurs in such a way includes multiple-order chromatic dispersion such as 2nd, 3rd, . . . and more, in addition to negative, positive, or zero piece of chromatic dispersion.

Therefore, these four areas (I)–(IV) are formed in the photonic crystal layer as mentioned above, and by using the internal electrode 7 which is prepared in every four area (I), (II), (III) and (IV) independently, the bias voltage is applied to the respective area independently. Therefore, in each area the carrier density in the photonic crystal layer 4 is changed in order to vary the refractive index. Thus, the dispersion compensation up to the 3rd-order term can be performed. More concretely, in order that the plus or minus of the 2nd-order coefficient, the plus or minus of the 3rd-order coefficient, totally four numbers of chromatic dispersion (chromatic dispersion variation) are provided, the radius r of hole 41 and the interval a of the respective area are set as mentioned above.

Figure 3:
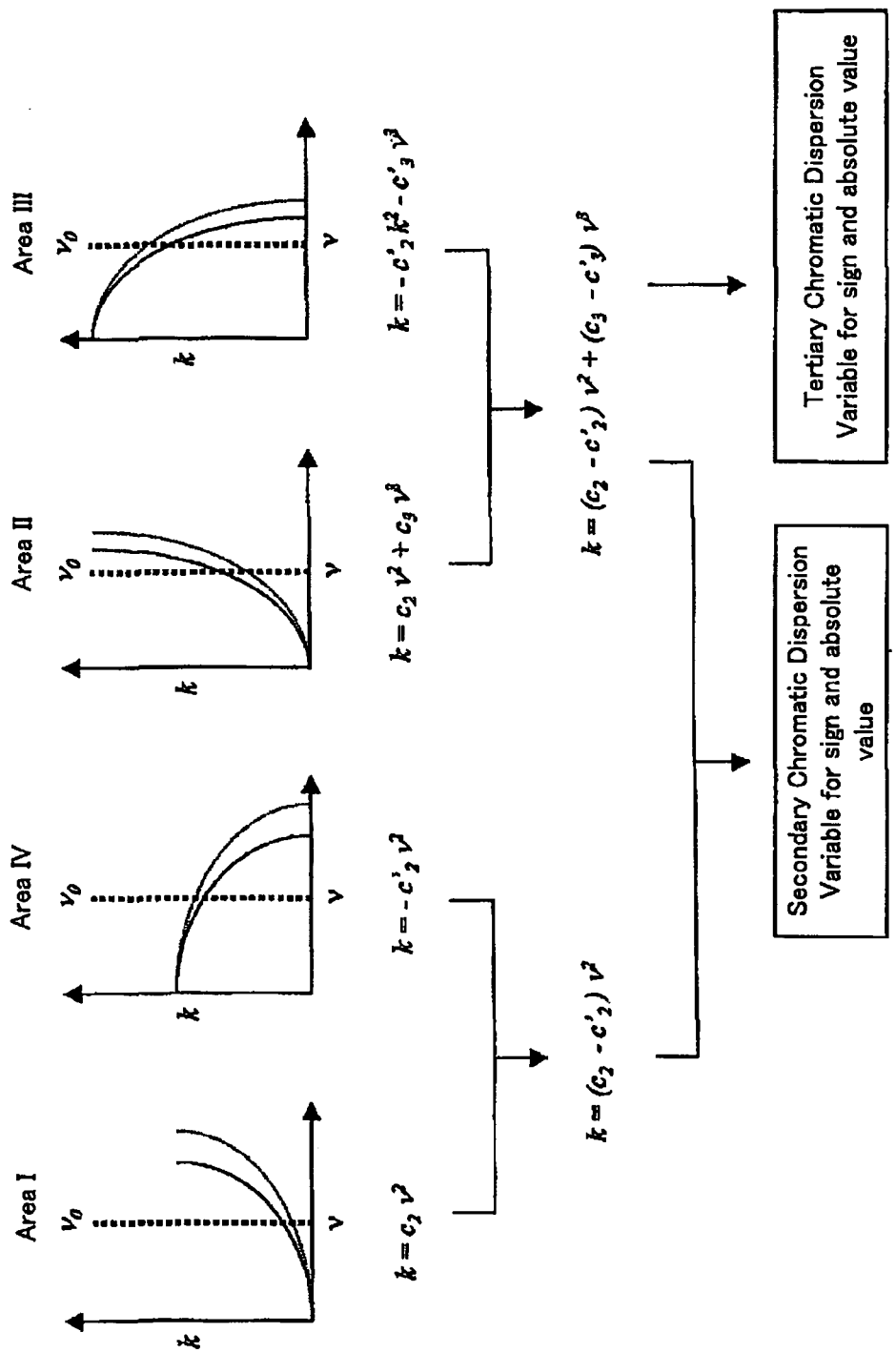
FIG. 3 is an illustrative view of waveguide modes in individual regions of the photonic crystal layer 4.

FIG. 3 is an illustrative view of waveguide modes in individual regions of the photonic crystal layer. As shown in FIG. 3, when the area (I) provides a chromatic dispersion wherein the 2nd-order coefficient is positive, the area (IV) provides a chromatic dispersion wherein the 2nd-order coefficient is negative, the area (II) provides a chromatic dispersion wherein the 3rd-order coefficient is positive, and the area (III) provides a chromatic dispersion wherein the 3rd-order coefficient is negative, the individual areas have characteristics which are expressed by the following equation:

In area (I), $k=c_2 v^2$;

In area (I), $k=-c_2' v^2$;

In area (I), $k=c_2'' v^2+c_3 v^2$; and

In area (IV), $k=-c_2''' v^2-c_3' v^2$

The respective equations, however, represent the frequency-wavenumber characteristic curve around the center frequency by approximating with the power series of v, wherein k is the wavenumber, c is a positive number, and v is the frequency measured with respect to the center frequency as the origin.

In equation (1) which is obtained by composition of the above equations for the area (I)–(IV), the coefficient: $(c_2-c'_2+c''_2-c'''_2)$ of the 2nd-order term provides the 2nd-order dispersion compensation value to the light which is guided in the dispersion compensation device 1; and the coefficient: $(c_3-c'_3)$ of the 3rd-order term provides the 3rd-order dispersion compensation value to the light which is guided in the dispersion compensation device 1

$$k=(c_2-c'_2+c''_2-c'''_2)v^2+(c_3-c'_3)v^3 \qquad (1)$$

Therefore, by adjusting the bias voltage applied to each area with the internal electrode 7 so as to vary the curves, a chromatic dispersion variation can be provided to the optical pulse which is guided by the core layer 5.

In this embodiment, in order to perform the dispersion compensation by providing the chromatic dispersion variation up to the 3rd-order term to the waveguide mode of the optical pulses guided through the dispersion compensation device 1, the photonic crystal layer 4 is constructed so as to have the four areas (I)–(IV). However, only by increasing or decreasing the number of the areas, the number of terms to be varied can be increased or decreased easily. Namely, when it is intended that the dispersion compensation is performed by providing the chromatic dispersion variations up to the $n^{th}$ item, what is necessitated is only to provide $2(n-1)$ areas in the photonic crystal layer 4.

In the embodiment mentioned above, the areas are arranged in the order of increasing the interval a between the hole 41 within the respective areas, in order to minimize the light attenuation by the reflection due to the difference of the mutual refractive index values at the boundary section between the adjacent areas. However, the arrangement is not limited thereto. As far as the arrangement can minimize the difference of the refractive index between the adjacent areas so as to minimize the light attenuation by the reflection due to the difference of the mutual refractive index values, any arrangement may be adaptable. Such as the condition that the areas are arranged in the order of decreasing the interval a between the hole 41 within the respective area, or the condition of the order of at random, may be adaptable.

<Fabrication Procedures of the Dispersion Compensation Device>

Next, the fabrication procedures of dispersion compensation device 1 are described with reference to FIGS. 4A–4O.

Figure 4A:
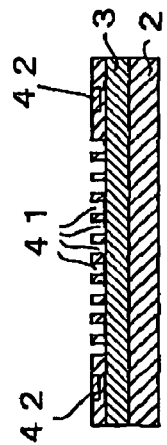
FIGS. 4A–4O are illustrative views of fabrication procedures of a dispersion compensation device 1.

First, onto a substrate 2 which consists of Si, a clad layer 3 which consists of $SiO_2$ is layered (See FIG. 4A). For example, as for the substrate 2, it may have about 500 μm in thickness, and as for the clad layer 3, it may have about 300 nm in thickness.

Figure 4B:
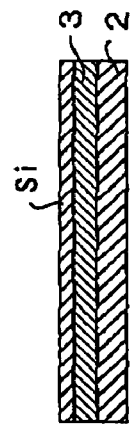

Next, onto the clad layer 3, Si which comes to form a matrix of photonic crystal layer 4 is layered (See FIG. 4B).

Figure 4C:

Then, at a prescribed size and interval, holes 41 are patterned in this Si (corresponding to the photonic crystal region R1 in photonic crystal layer 4), and simultaneously, terminal parts 42 are formed at both sides (corresponding to the extended regions R2 in the photonic crystal layer 4) (See FIG. 4C).

Such a photonic crystal layer 4 is prepared, for example, by applying a resist onto the Si, patterning the resist so as to form the pattern of holes 41 on the resist in the prescribed sizes and intervals which were specified individual areas (I)–(IV) with a known technique such as photolithography, and then, dry etching the silicon 41 so as to form the pattern of holes 41 in the Si.

Separately, the terminal parts 42 are doped with impurities by a known technique such as ion implantation. Thereby, the terminal parts 42 to which electrodes 8a, 8b will be electrically connected come to have low resistivity, and thus, the electric field tends to be concentrated between the parts.

As for the impurity, any p type devices such as B (boron), Al (aluminum), Ga (gallium), In (indium), Tl (thallium), and etc., or any n type devices such as N (nitrogen), P (phosphorus), As (arsenic), Sb (antimony), Bi (bismuth) and etc., which devices are also used in the semiconductor industries, can be used. Among them, as the p type device, B (the boron) is preferable because it facilitates doping.

Figure 4D:
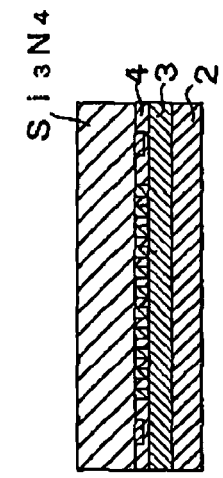
Figure 4E:

Next, $SiO_2$ film is utilized thereon (See FIG. 4D), in order to fill the interior spaces of the holes 41 with the silicon oxide film of which dielectric constant is different from that of the silicon (the matrix of the photonic crystal layer 4), and excessive portions of the silicon oxide is removed by polish, e.g. CMP (Chemical Mechanical Polish)), and so on (See FIG. 4E). In this way, onto the clad layer 3, the photonic crystal layer 4 which consists of silicon oxide film ($SiO_2$) and silicon (Si) of which dielectric constants are mutually different, and the $SiO_2$ film is arranged into the Si layer with the prescribed sizes and intervals which were specified individual areas (I)–(IV) is formed.

Figure 4F:
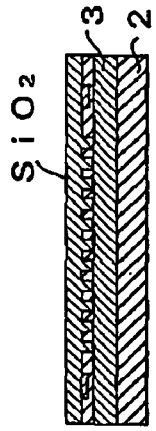

Next, silicone nitride ($Si_3N_4$) layer is layered on the photonic crystal layer 4 in order to form the core layer 5 (See FIG. 4F).

Figure 4G:
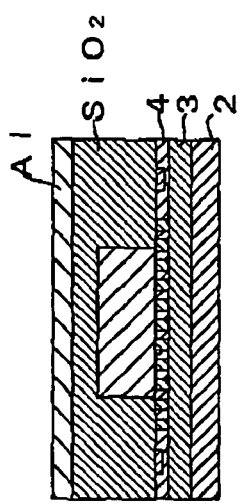

Then, the $Si_3N_4$ layer is subjected to patterning with the prescribed width and height (See FIG. 4G). For example, 1 μm in width and 400 nm in height are used, although they are set to optimized values in accordance with the incident beam diameter of the optical pulse to be targeted for giving the dispersion compensation in the dispersion compensation device.

Figure 4H:
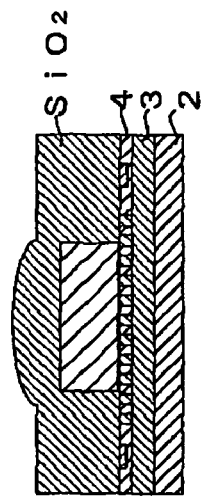
Figure 4I:
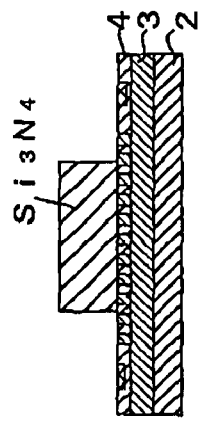

Next, onto the photonic crystal layer 4 and the core layer 5, $SiO_2$ film is layered in order to prepare the clad layer 6 (See FIG. 4H), excessive portions of the silicon oxide are removed by CMP, etc. After the removing, aluminum (Al) is evaporated and deposited thereon in order to prepare the interior electrode 7 (See FIG. 4I).

Figure 4J:
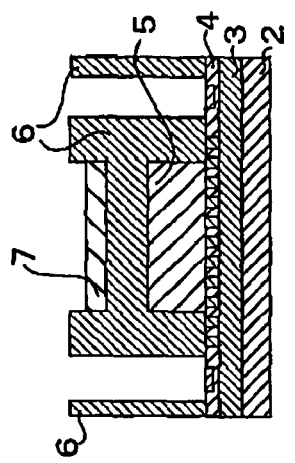

The deposited aluminum (Al) is shaped in a prescribed size so as to locate it over the core layer 5 (See FIG. 4J).

Figure 4K:
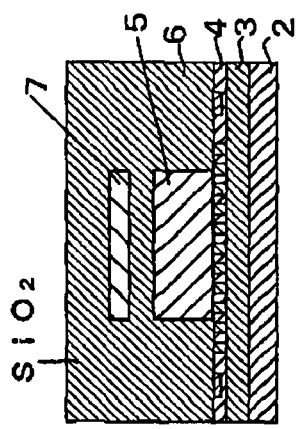

Then, onto the $SiO_2$ film which is layered on the photonic crystal layer 4, and onto the aluminum layer, another $SiO_2$ film is further layered, and excessive parts of the silicon oxide is removed by CMP, etc., for the purpose of the surface stabilizing treatment (passivation) (See FIG. 4K). By such procedures, the interior electrode 7 is embedded in the silicon oxide film ($SiO_2$) (clad layer 6).

Figure 4L:
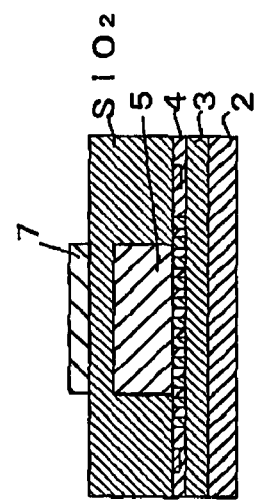

Then, the silicone oxide film is subjected to patterning (See FIG. 4L).

Figure 4O:
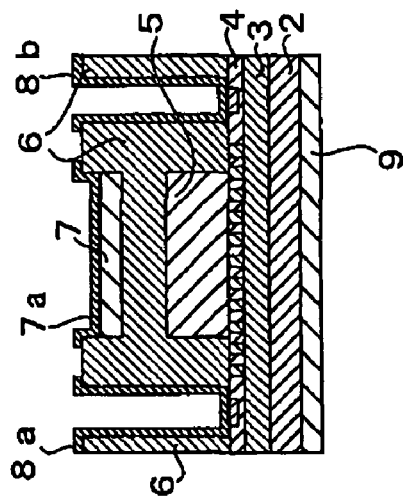
Figure 4N:
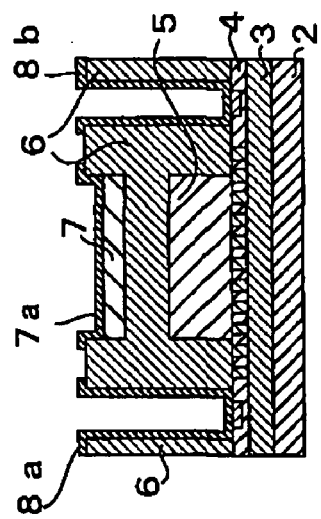
Figure 4M:
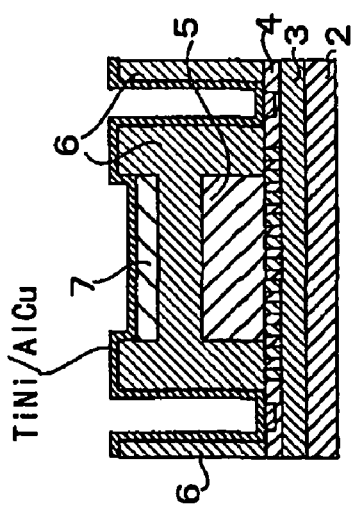

After patterning of the $SiO_2$ film, titanium/nickel alloy (TiNi) and aluminum/copper alloy (AlCu) which are the material for electrode 7a, and electrodes 8a, 8b, are layered sequentially on the whole surface area of the layered product (See FIG. 4M), then, they are subjected to patterning on the area of clad layer 6 so as to form the electrode 7a, and electrodes 8a, 8b (See FIG. 4N).

Independently, on the lower surface of substrate 2, aluminum (Al) is evaporated and deposited in order to prepare the reference electrode 9 (See FIG. 4O). With respect to the lower surface of substrate 2 to which the reference electrode 9 is connected, it is preferable to dope impurities therein in order to decrease the electric resistance, for example, as same level with that of the terminal parts 42.

With respect to the dispersion compensation device 1 which is fabricated according to the above explanation, it is possible that the design of photonic crystal layer 4 and the design of the wave guide are mutually independent, because the photonic crystal layer 4 for giving the chromatic dispersion is provided apart from the waveguide for guiding the light. Therefore, even if the diameter of the light pulse is relative large, the light pulse can be easily launched into the device by adjusting the size of core layer 5.

Also, because the core layer 5 is located on the photonic crystal layer 4, the light pulses which are transmitted by the core layer 5 securely receive the chromatic dispersion variation which is provided by the photonic crystal layer 4.

Therefore, when the optical pulses which are picked up from the optical fiber transmission line are monitored, and then, on the basis of the information for chromatic dispersion obtained therefrom, the chromatic dispersion is controlled by a dispersion compensation system, by using the dispersion compensation device 1 according to this invention in the system, it is possible to perform optimum dispersion compensation on all occasions even if any condition change by temperature, weather and so on happens at the optical fiber transmission line.

As a result, the chromatic dispersion compensation to support the ultrafast and large-capacity optical communication which utilizes a wide spectral band can be realized and further speeding-up of the transmission rate is also able to be sufficiently realized.

In above mentioned embodiment, the refractive index is changed by applying bias voltage using the internal electrode 7 which is provided in each area of the photonic crystal layer 4. However, any other alternative method can be used as the energy supplying part.

For example, it is possible to prepare heaters individually for the respective areas (I) to (IV), and electric current is applied to each heater in order to rise the temperature of photonic crystal layer 4, because of the temperature dependence of the refractive index. As the result, it is possible to change the refractive index of the photonic crystal layer 4.

Alternatively, when a prescribed stress is given by a piezoelectric device and it is applied to the photonic crystal layer 4 from the both side thereof, it is possible to create distortion to photonic crystal layer 4 so as to change the refractive index of the photonic crystal layer 4.

Incidentally, in the above mentioned embodiment, the indicated sizes, etc. of the respective parts, or members, are exemplified on the assumption that the dispersion compensation is performed to the optical pulse having a frequency of 1.55 μm band which is a wavelength band for the communication.

<Modified Examples of the Photonic Crystal Layer>

The other modified configuration examples of the photonic crystal layer 4 are described below.

(1) Modified Example 1 of the Photonic Crystal Layer

A modified configuration example of the photonic crystal layer 4 is described with reference to FIGS. 5A, 5B.

In the above described embodiment, the photonic crystal layer 4 is composed of the photonic crystal region R1 and extended regions R2, the photonic crystal region R1 being prepared by providing a plural number of plane-shaped holes 41 to the matrix material which is made of Si, and then filling up the holes 41 with $SiO_2$ film of which dielectric constant is different from that of the matrix material, and the extended regions being located at both sides of the photonic crystal region R1 and being not provided with the hole 41. In this modified example, further by providing the barrier regions to inhibit or to restrain the propagation of the light and which are formed by a material the refractive index of which is smaller than Si at both side of the photonic crystal region R1, it is possible to transmit the light transmitted by the core layer 5 only on the photonic crystal region R1 without diffusing the light.

Figure 5A:
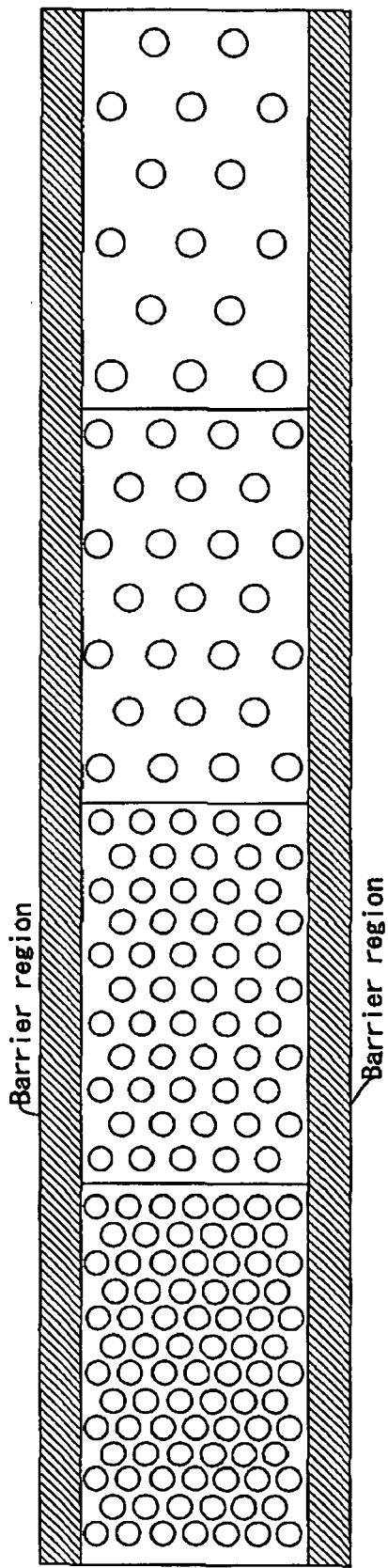
FIG. 5A is a schematic diagram of a dispersion compensation device having a photonic crystal layer 4 provided with barrier layers.
Figure 5B:
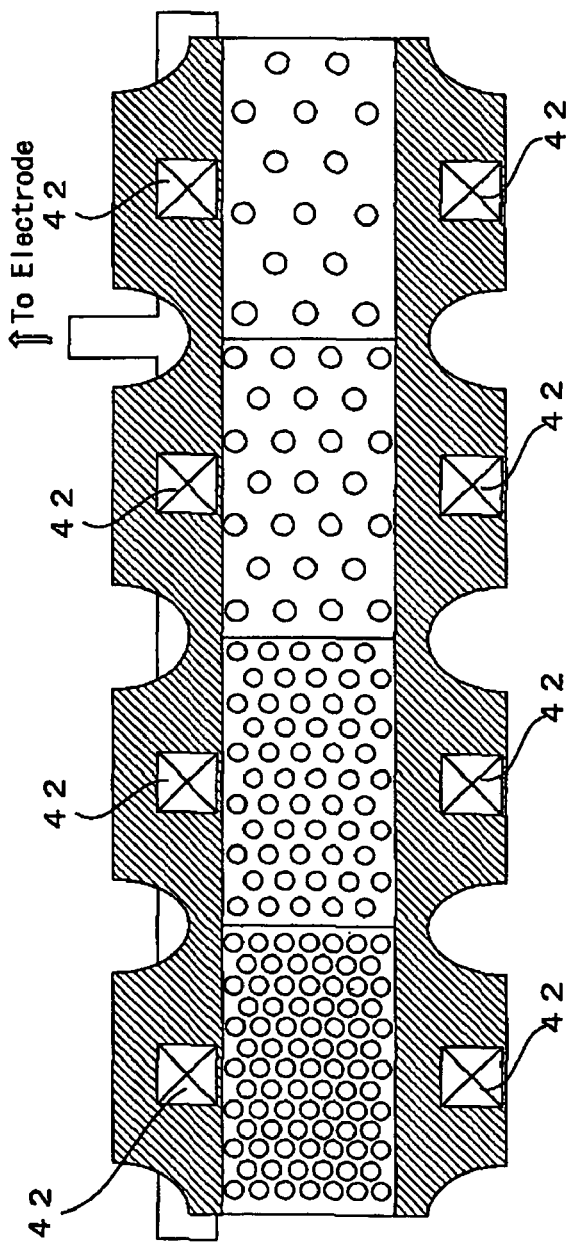
FIG. 5B is an illustrative view for the construction of the dispersion compensation device having a photonic crystal layer 4 provided with barrier layers.

FIG. 5A is a schematic diagram of a dispersion compensation device having a photonic crystal layer 4 provided with barrier layers, and FIG. 5B is a more concrete illustrative view for the construction of the photonic crystal layer 4 provided with barrier layers.

As shown in FIGS. 5A and 5B, by providing barrier regions at both sides of the photonic crystal area R1 along the light propagation direction, wherein the barrier regions are made of a material the refractive index of which is smaller than silicon (Si), it is possible to repress the light diffusion to the direction (being the right and left direction of the paper of FIGS. 5A, 5B) perpendicular to the light propagation direction (being from the bottom to the upper side of the paper of FIGS. 5A, 5B), and thus, to guide the light securely onto the photonic crystal region R1, namely, along the core layer 5.

Further, as shown in FIG. 5B, by providing the terminal parts 42 at the barrier regions, it is possible to function the barrier regions as potential holding parts with connecting to the electrodes 8a and 8b as the above mentioned energy supplying parts.

Although in above mentioned example, the barrier layers are formed by $SiO_2$ film or silicon nitride film which is the same material as that of the clad layer 3 (or clad layer 6), the material is not limited thereto, as far as the material has a refractive index which is smaller than that of the Si which is the matrix material of the photonic crystal layer 4.

(2) Modified Example 2 of the Photonic Crystal Layer.

Another modified configuration example of the photonic crystal layer 4 is described with reference to FIG. 6. In this example, the barrier areas as mentioned above can be realized by forming holes 41 in a different condition from that of above mentioned embodiment in the photonic crystal area R1.

Figure 6:
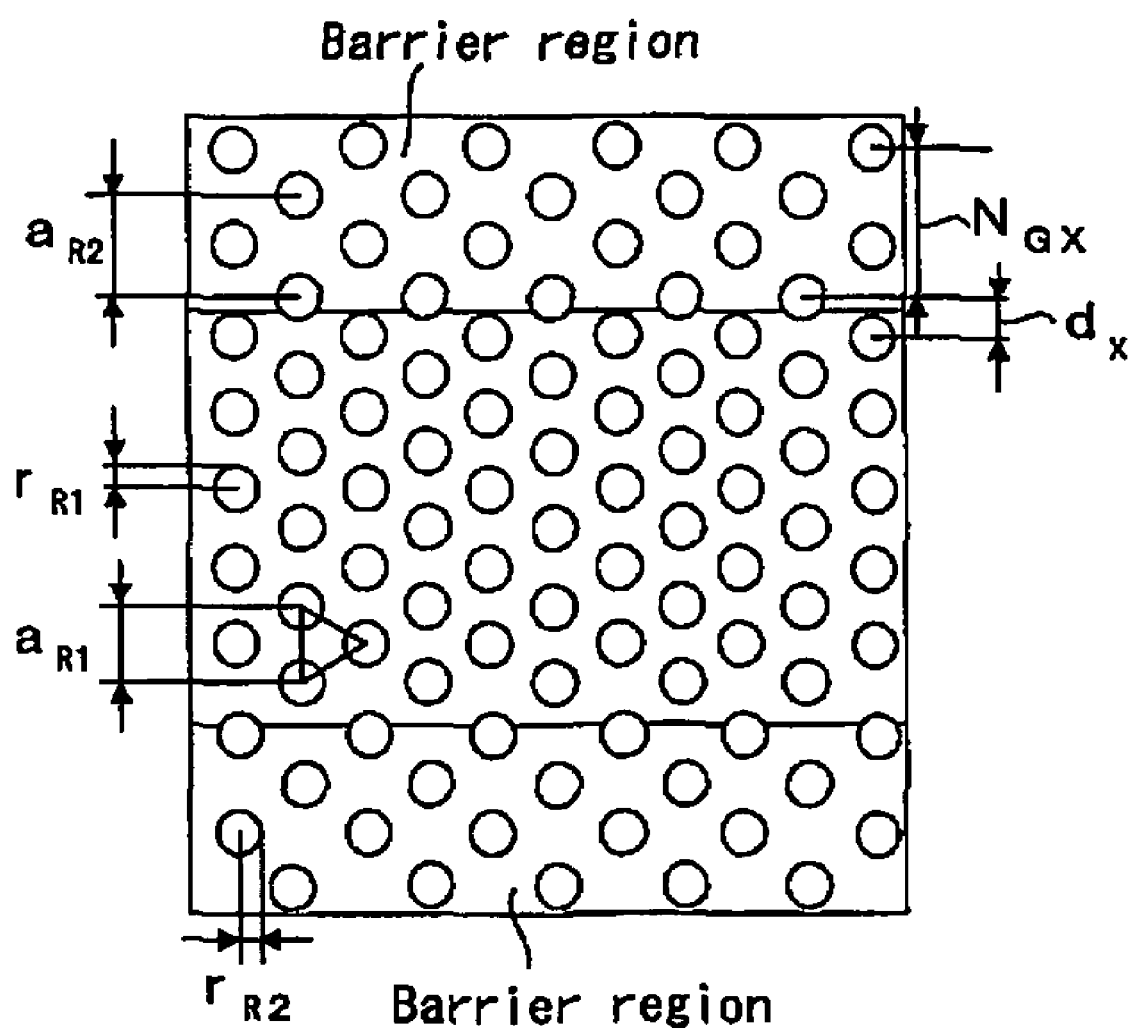
FIG. 6 is an illustrative view for another modified construction embodiment of the dispersion compensation device having a photonic crystal layer provided with barrier layers.

FIG. 6 is an illustrative view for another modified construction example of the photonic crystal layer 4 which has holes 41 formed in the photonic crystal region R1 with a modified condition.

An interval (pitch) between holes 41 in each area is described using FIG. 6. Incidentally, we suppose that we explain the photonic crystal where the photonic band region is laid on the area (I) or area (II) as the lower-branch photonic band region.

Assuming that the interval (pitch) between holes 41 in the photonic crystal region R1 is $a_{R1}$, the interval (pitch) between holes 41 in the barrier region is $a_{R2}$, the center-to-center interval between holes 41 which are adjacent at the boundary of the barrier region and the photonic crystal region R1 is $d_x$. When it is intended the barrier region functions as the photonic gap region, the relationship between the interval $a_{R1}$ for holes 41 in the photonic crystal region R1 and the interval $a_{R2}$ for holes 41 in the barrier region should satisfy the relation, $a_{R1} < a_{R2}$.

At this condition, the center-to-center interval $d_x$ between holes 41 which are adjacent at the boundary of the barrier region and the photonic crystal region R1 should be set the following conditions. The reason why the lower limit of the center-to-center interval $d_x$ between holes 41 is to avoid that holes 41 mutually adjacent at the boundary of the barrier region and the photonic crystal region R1 are overlapped, while the upper limit is set in order to avoid the light is trapped at the boundary.

$$a_{R1} + a_{R2} < d_x < a_{R1} + a_{R2} + \lambda/4 \qquad (2)$$

The holes 41 in each area are formed to meet the above condition. For one example, in the area (I), it is possible to set that the interval $a_{R1}$ for holes 41 in the photonic crystal region R1 is 403 nm, the radius $r_{R1}$ is 121 nm, the interval $a_{R2}$ for holes 41 in the barrier region is 434 nm, the radius $r_{R2}$ is 130 nm, the mean interval $d_x$ between holes 41 which are adjacent at the boundary of the barrier region and the photonic crystal region R1 is 600 nm.

It is possible to make the barrier region as the photonic gap, when the correlation between the radius $r_{R1}$ of hole 41 in the photonic crystal region R1 and radius $r_{R2}$ of hole 41 in the barrier region satisfies the relation $r_{R1}>r_{R2}$, even if the intervals of the holes 41 in the respective areas are the same (namely, $a_{R1}=a_{R2}$). In this case, since the photonic-crystal region and the barrier region do not differ (be equal) in terms of the interval (pitch) of the holes 41, there is no need for setting the condition of the center-to-center distance (hereinafter, referred to as center-to-center interval) $d_x$ between holes 41 which are adjacent at the boundary of the barrier region and the photonic-crystal region R1. For example, when the intervals $a_{R1}$ and $a_{R2}$ for holes 41 in the individual regions are set to 403 nm and the radius $r_{R1}$ of holes 41 in the photonic crystal region R1 is set to 121 nm, the radius $r_{R2}$ of holes 41 in the barrier region may be set to 110 nm.

On the other hand, in the case of the photonic crystal where the photonic-crystal region is laid on the area (III) or area (IV) as the upper-branch photonic band region, to make the barrier region as the photonic gap can be attained by adjusting the correlation between the radii of holes in the respective regions to be $r_{R1}<r_{R2}$ so as to set the correlation between the intervals (pitches) of holes in the respective regions to be $a_{R1}>a_{R2}$. With respect to the center-to-center interval $d_x$ between holes 41 which are adjacent at the boundary of the barrier region and the photonic-crystal region R1 under this situation, to satisfy the above mentioned relation (2) is required as in the above mentioned case.

Alternatively, it is also possible to make the barrier region as the photonic gap, when the correlation between the radius $r_{R1}$ of hole 41 in the photonic crystal regions R1 and radius $r_{R2}$ of hole 41 in the barrier region satisfies the relation $r_{R1}<r_{R2}$, even if the intervals of the holes in the respective areas are the same (namely, $a_{R1}=a_{R2}$).

Incidentally, as shown in the above modified configuration example 1, by providing the terminal parts 42 at the barrier regions, it is possible to function the barrier regions as potential holding parts with connecting to the electrodes 8a and 8b.

<Other Application of the Photonic Crystal Layer>

The photonic crystal layer 4 described above mentioned embodiment is one which comprises two or more photonic crystal regions, and by varying the size and interval of the holes 41 which are arranged in the respective regions, it can realize positive or negative signs' dispersion compensation, and multiple-order dispersion compensation. The dispersion compensating device using the photonic crystal layer is also explained in detail as above.

Incidentally, as described in detail in the above embodiment entitled <chromatic dispersion variation> with reference to FIG. 3, the photonic crystal layer 4 can vary its refractive index by changing the carrier density when bias voltage is applied. Change in the refractive index leads to change in the phase (radian) of the light to be guided.

Figure 7:
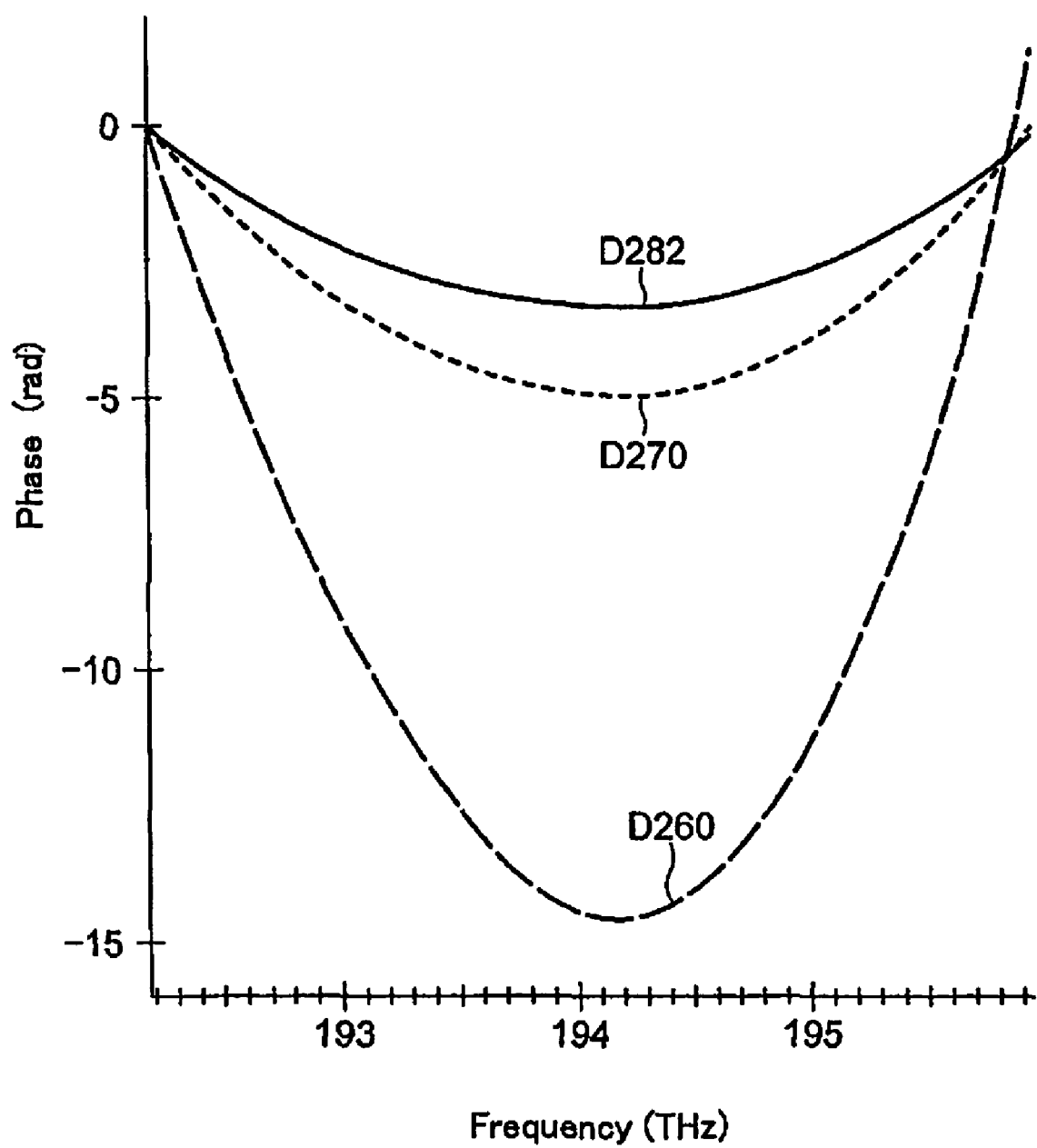
FIG. 7 is a graph which shows the change of the phase against the frequency of light.

FIG. 7 is the graph showing the change of the phase to the frequency of light when the diameters D of the hole 41 in the photonic crystal layer 4 are 282 nm, 270 nm, and 260 nm, respectively. In FIG. 7, the solid line curve shows phase change when the diameters D of the hole 41 in the photonic crystal layer 4 is 282 nm (D282), the dotted line curve shows that of 270 nm (D270), and the broken line curve shows that of 260 nm (D260). As shown in FIG. 7, the smaller the diameter D of hole 41 is, the bigger the phase change of the light becomes.

Figure 8:
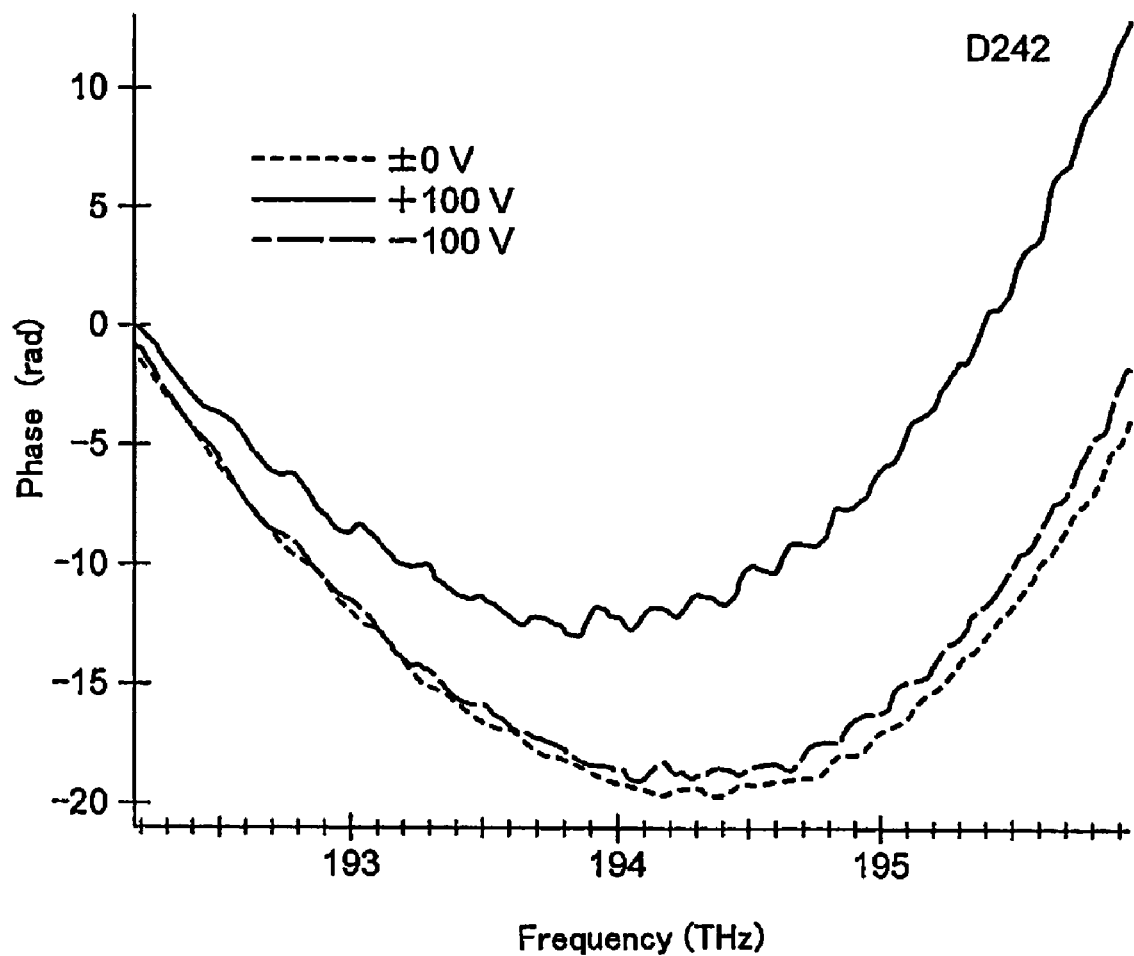
FIG. 8 is a graph which shows the change of the phase versus the frequency of light when hole 41 is 242 nm in diameter.

FIG. 8 is a graph showing the change of the phase to the frequency of light when the hole 41 of the photonic crystal layer 4 is 242 nm in diameter, and the bias voltage is of 0 V, +100 V, −100 V. In this way, according to the magnitude of the bias voltage to be applied to the photonic crystal layer 4, the phase of the light can change variously.

When it is at normal state (i.e., not applying bias voltage to the photonic crystal layer 4), the characteristic curve of the light which is represented by the wavenumber and the frequency has a proportional relationship with the light velocity c as a proportional coefficient. When the bias voltage is applied to the photonic crystal layer 4, the characteristic curve of the light is changed around the photonic gap under the influence of the photonic gap.

Using the characteristic of photonic crystal as mentioned above, it is possible to provide the chromatic dispersion compensation device.

Figure 9:
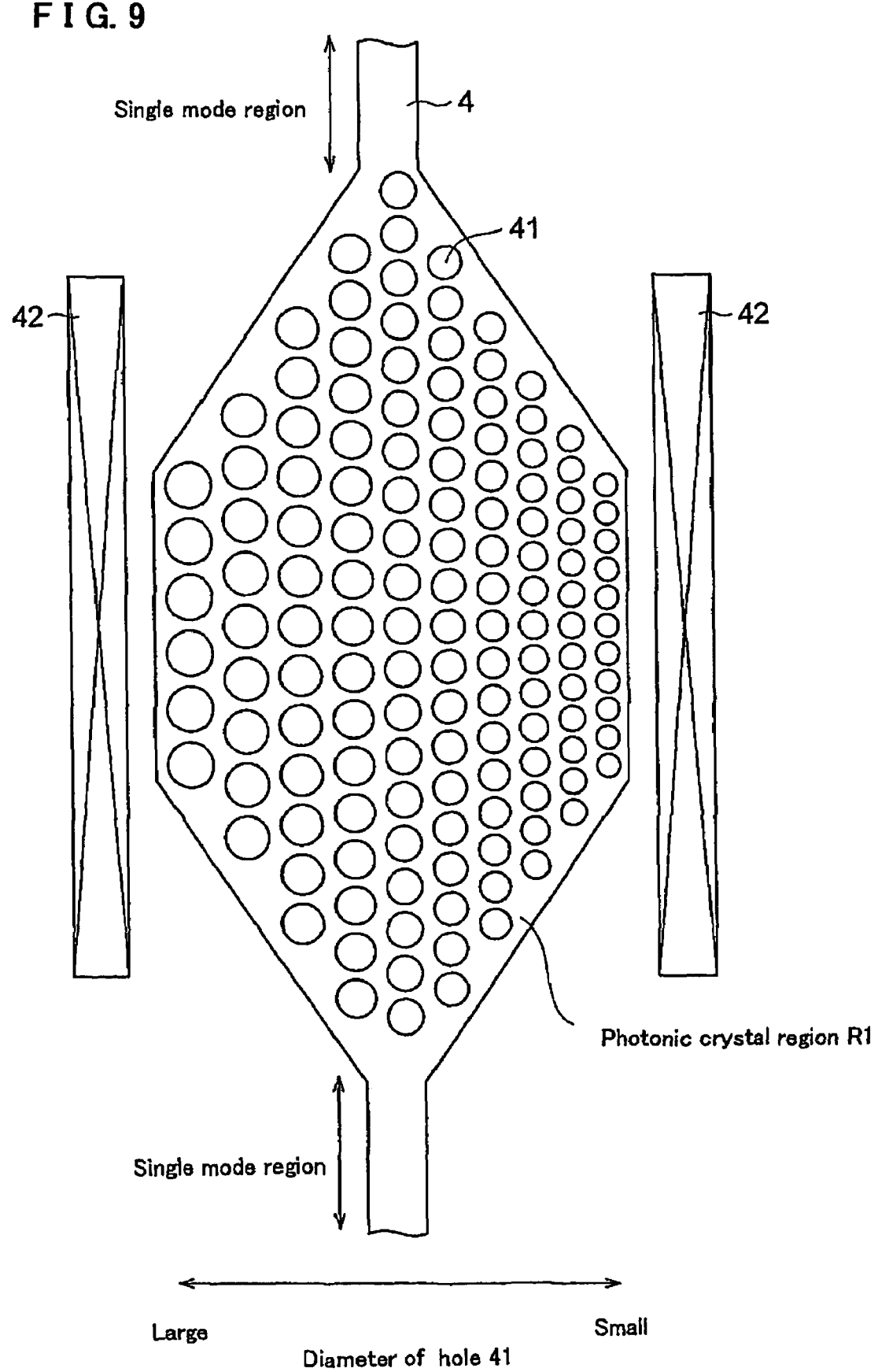
FIG. 9 is an illustrative view of a chromatic dispersion compensation device using a multi-mode waveguide.

(1) The Technique of the Application to the Chromatic Dispersion Compensation Device by Multi-Modes FIG. 9 is an illustrative view of a chromatic dispersion compensation device using a multi-mode waveguide. For the purpose of illustrating with ease the function as the chromatic dispersion compensation device of the photonic crystal layer, in FIG. 9, the constitutions other than the photonic crystal layer 4 and the terminal parts 42 are omitted.

As shown in FIG. 9, the photonic crystal layer 4 comprises single mode regions at the input end and the output end, and a photonic crystal region R1 at the middle area of the photonic crystal layer 4 in which holes 41 are formed.

From the single mode region at the input end to the center portion of the photonic crystal layer 4, the cross-section areas perpendicular to the light propagation direction (the direction to the bottom of the paper of FIG. 9) are gradually increased along the light propagation direction. Then, from the center portion of the photonic crystal layer 4 to the single mode region at the output end, the cross-section areas perpendicular to the light propagation direction are gradually decreased along the light propagation direction.

Therefore, the light which is transmitted on the photonic crystal layer 4 by being guided with the core layer will becomes multi-mode light propagated on the photonic crystal region R1, and on the basis of the bias voltage control applied to the terminal parts 42 located at both side of the photonic crystal region R1 as illustrated in FIG. 9, the multi-mode light conducts via various paths. In the individual various paths, the individual mode of the light passes the photonic crystal region R1 having a varied diameter D of hole 41. When the diameter D of hole 41 is varied, the frequency position of the photonic gap is varied, and the photonic band is subjected to frequency shift, and thus, the chromatic dispersion value at the region corresponding to the frequency of the light to be propagated comes to change. Therefore, by using the multi-mode waveguide, it is possible to control variably the chromatic dispersion value with controlling the light transmission paths by applying the bias voltage.

For example, when the above waveguide is fabricated by constructing that the photonic crystal layer provides the lower-branch photonic band region, and setting the wavelength of the incident light to 1530–1560 nm, namely, the light in the optical communication wavelength band which is called "c-band", setting the pitch (interval) between holes 41 formed in the photonic crystal R1 to 403 nm, setting the diameter D of the hole 41 to an amount variable in the range of 230–280 nm, and further setting the length of the multi-mode waveguide to 100 mm, the obtained chromatic dispersion compensation device can vary the chromatic dispersion with in the range of normal dispersion value of −500 to 0 ps/nm, and thus, it is able to produce a more compact and low-cost chromatic dispersion compensation device. Further, because of no need of other components, the loss of the light can be reduced.

Figure 10:
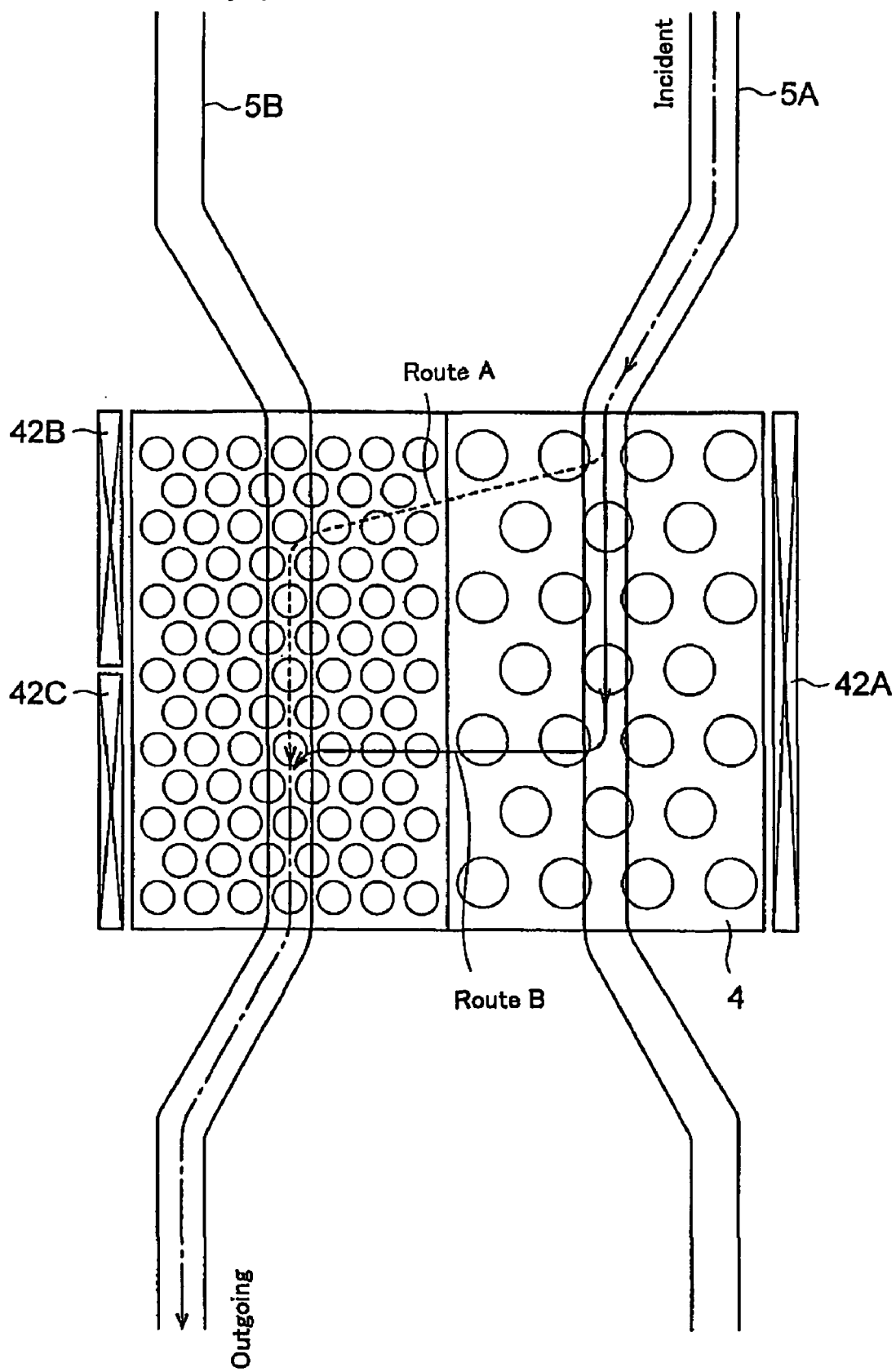
FIG. 10 is an illustrative view of a chromatic dispersion compensation device using directional coupling.

(2) The Technique of the Application to the Chromatic Dispersion Compensation Device by the Directionality Combination The other application technique of the photonic crystal layer 4 is described with reference to FIG. 10. FIG. 10 is an illustrative view of a chromatic dispersion compensation device using directional coupling as another application technique using the photonic crystal layer 4. For the purpose of illustrating with ease the function as the chromatic dispersion compensation device of the photonic crystal layer, in FIG. 10, the constitutions other than the photonic crystal layer 4, core layer 5 and the terminal parts 42 are omitted.

As shown in FIG. 10, two or more areas each of which has a diameter D of the hole 41 in the photonic crystal layer the diameter being mutually different from that in the other photonic crystal layer, are provided in a direction perpendicular to the light propagation direction. In FIG. 10, two areas are provided, namely, an area of having a relative large diameter D of hole 41 (right side in the paper of FIG. 10), and an area of having a relatively small diameter D of hole 41 (left side in the paper of FIG. 10).

Further, the waveguides which comprise the core layer 5, etc. are located on the respective areas of the photonic crystal layer 4 separately. In FIG. 10, two waveguides are provided, namely, a waveguide which includes a core layer 5A, and another waveguide which includes a core layer 5B, and the lights guided with the respective waveguides are passed on the mutually different areas each having a varied diameter D of the hole 41 in the photonic crystal layer 4.

Further, the terminal parts 42A, 42B and 42C are provided for connecting electrically to the photonic crystal layer 4 and thus providing energy thereto. Among these terminal parts, the terminal part 42A is located at the right side of the photonic crystal layer 4 in the paper of FIG. 10, the terminal part 42B is located at the left upper side of the photonic crystal layer 4 in the paper of FIG. 10, and the terminal part 42C is located at the left lower side of the photonic crystal layer 4 in the paper of FIG. 10.

According to the above constitution, the path of the light can be continuously varied by the voltage applied to the terminal parts 42A, 42B and 42C, and the bias voltage applied to the referential electrode 9. (See FIG. 1).

Concretely described with reference to FIG. 10, at first, the light launched into the core layer 5A (shown as the alternate long and short dash line in FIG. 10), is passed through the path A shown as broken line in FIG. 10, when the bias voltage is not applied between the terminal part 42A and the referential electrode 9, while when the bias voltage (for example, 10 V) is applied to, it passed through the path B shown as the solid line.

As illustrated above, by varying the bias voltage from zero to any level continuously, the light transmission path can be continuously changed from path A to path B, or path B to path A. This is because photonic band is subject to frequency shift by the bias voltage, and then, the phase difference between the symmetry and asymmetry modes of the connected waveguide is changed.

Then, the chromatic dispersion value is, as like the case of the multiple mode waveguide, changed by the path, because the light is transmitted through various photonic crystal regions having a respectively different diameter in accordance with the change of the transmission path. Therefore, it is possible to control the chromatic dispersion continuously and variably by using this waveguide.

As described above, by providing in the photonic crystal layer 4, two or more areas which have mutually different diameter D of hole 41, or interval (pitch), etc., in the direction of perpendicular to the light propagation direction, and providing two or more terminal parts 42, it is possible to give a desirable modulation to the light launched to the chromatic dispersion compensation device variously. Therefore, it is possible to realize the chromatic dispersion compensation device of a compact in size and a low cost.

The present invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-315167, filed on Oct. 29, 2004, including the specification, claims, drawings and summary are incorporated herein by reference in its entirety.

What is claimed is:

1. A dispersion compensation device for compensating chromatic dispersion of optical pulses launched from the exterior, comprising a waveguide and a photonic crystal part, said waveguide comprising a core part for guiding the optical pulse from an input end to an output end and a clad part consisting of a first clad layer and a second clad layer, said photonic crystal part providing a chromatic dispersion variation of a proper dispersion characteristic to the optical pulses guided through the waveguide, the chromatic dispersion variation having an absolute value of the variation and a positive or negative sign, wherein the photonic crystal part is layered onto the first clad layer, the core part is layered onto the photonic crystal part, and the second clad part is formed so that a portion of which is layered onto the photonic crystal part and a remaining part of which covers the exposed surface of the core part.

2. A dispersion compensation device according to claim 1, wherein said photonic crystal part is made of a first material and a second material, the refractive index of the first and second materials being different from each other, and plane-shaped laminae made of the first material and each having a predetermined size being arrayed at predetermined intervals in the matrix made of the second material.

3. A dispersion compensation device according to claim 2, wherein said photonic crystal part comprises two or more regions which are laid along the propagation direction of the optical pulse guided through said waveguide, and the size and interval of the first material in each region are determined so that the respective regions have a mutually different dispersion characteristic.

4. A dispersion compensation device according to claim 1, wherein said dispersion compensation device further comprises an energy supplying part from which an energy is supplied to the photonic crystal part so that the absolute value and the sign of the chromatic dispersion is controlled by changing the refractive index of said waveguide.

5. A dispersion compensation device according to claim 4, wherein the energy supplying part gives the energy to the individual regions of said photonic crystal part.

6. A dispersion compensation device according to claim 4, wherein the second material is a semiconductor which possesses a predetermined carrier density under the stationary state, and the energy supplying part supplies an energy to the photonic crystal part, so that the energy induces a change in the carrier density in the semiconductor.

7. A dispersion compensation device according to claim 6, wherein the energy supplying part comprises a voltage applying part which provides voltage on the photonic crystal part in order to vary the carrier density in the semiconductor.

8. A dispersion compensation device according to claim 7, wherein the energy supplying part comprises a potential holding part for holding the potential of the second material to a prescribed level.

9. A dispersion compensation device according to claim 1, wherein said dispersion compensation device further comprises barrier regions which inhibit propagation of the light and which are formed along the light propagation direction in the both sides of the photonic crystal part.

* * * * *